(12) United States Patent
Wallis

(10) Patent No.: US 7,896,221 B2
(45) Date of Patent: Mar. 1, 2011

(54) METHOD OF MANUFACTURING AN AEROFOIL

(75) Inventor: Michael J Wallis, Clitheroe (GB)

(73) Assignee: Rolls-Royce PLC, London (GB)

( * ) Notice: Subject to any disclaimer, the term of this patent is extended or adjusted under 35 U.S.C. 154(b) by 0 days.

(21) Appl. No.: 12/757,412

(22) Filed: Apr. 9, 2010

(65) Prior Publication Data

US 2010/0270360 A1 Oct. 28, 2010

(30) Foreign Application Priority Data

Apr. 22, 2009 (GB) .................................. 0906850.3

(51) Int. Cl.
  B21D 53/78 (2006.01)
  B21K 3/04 (2006.01)
  B23P 15/04 (2006.01)
  B23K 20/00 (2006.01)
(52) U.S. Cl. ...................... 228/194; 228/262.71; 29/889; 29/889.2; 29/889.71
(58) Field of Classification Search ......................... None
  See application file for complete search history.

(56) References Cited

U.S. PATENT DOCUMENTS

| 2,754,203 | A | * | 7/1956  | Vordahl ......................... 420/421 |
| 3,854,194 | A | * | 12/1974 | Woodward ..................... 228/194 |
| 3,957,194 | A | * | 5/1976  | Woodward ..................... 228/194 |
| 4,096,296 | A | * | 6/1978  | Galmiche et al. ............. 427/247 |
| 4,318,672 | A |   | 3/1982  | Hansen |
| 4,839,237 | A | * | 6/1989  | Coulon et al. ................. 428/610 |
| 5,165,859 | A |   | 11/1992 | Monroe |
| 5,261,940 | A | * | 11/1993 | Berczik .......................... 75/236 |
| 5,363,554 | A | * | 11/1994 | Partridge et al. ............ 29/889.71 |
| 5,447,582 | A | * | 9/1995  | Eylon et al. .................... 148/669 |
| 5,448,828 | A | * | 9/1995  | Willems et al. ............... 29/889.1 |
| 5,469,618 | A | * | 11/1995 | LeMonds et al. ........... 29/889.72 |
| 5,503,532 | A | * | 4/1996  | Schilling ....................... 416/233 |
| 5,558,728 | A | * | 9/1996  | Kobayashi et al. ........... 148/421 |
| 5,573,604 | A | * | 11/1996 | Gerdes .......................... 148/237 |
| 5,873,703 | A | * | 2/1999  | Kelly et al. ............... 416/241 R |
| 5,876,183 | A |   | 3/1999  | Furlan et al. |
| 5,939,213 | A | * | 8/1999  | Bowden et al. ............... 428/608 |

(Continued)

FOREIGN PATENT DOCUMENTS

JP  04-100682 A  *  4/1992

(Continued)

OTHER PUBLICATIONS

Machine translation of JP-5-263604A.*

(Continued)

*Primary Examiner* — Kiley Stoner
(74) *Attorney, Agent, or Firm* — Oliff & Berridge, PLC

(57) ABSTRACT

A method of manufacturing an aerofoil structure to have a portion with an increased erosion resistance, the method comprising: providing one or more titanium elements (2, 4, 6) and a beta-stabilizing material (8); wherein the one or more elements (2, 4, 6) have an alpha-beta microstructure; assembling the one or more elements (2, 4, 6) and the beta-stabilizing material (8) such that the beta-stabilizing material (8) is adjacent to the one or more elements (2, 4, 6); and heating the assembly such that the beta-stabilizing material (8) diffuses into an adjacent portion of the one or more elements (2, 4, 6), causing the adjacent portion of the one or more elements (2, 4, 6) to have a beta microstructure which provides an increased erosion resistance.

12 Claims, 1 Drawing Sheet

U.S. PATENT DOCUMENTS

| | | |
|---|---|---|
| 6,814,820 B2 * | 11/2004 | Ozbaysal ............... 148/671 |
| 7,364,801 B1 * | 4/2008 | Hazel et al. ............. 428/632 |
| 2002/0011540 A1 * | 1/2002 | De Castro Nodal et al. ................. 244/45 R |
| 2002/0012587 A1 | 1/2002 | Farrar et al. |
| 2002/0174540 A1 * | 11/2002 | Milburn ................ 29/889.7 |
| 2005/0278950 A1 | 12/2005 | Despreaux et al. |
| 2006/0021222 A1 * | 2/2006 | Andrews et al. ......... 29/889.72 |
| 2006/0068214 A1 | 3/2006 | Gigliotti et al. |
| 2008/0178456 A1 * | 7/2008 | Rice et al. ................ 29/521 |
| 2009/0293447 A1 * | 12/2009 | Roth-Fagaraseanu et al. ................ 60/39.091 |

FOREIGN PATENT DOCUMENTS

JP    A-5-263604    10/1993

OTHER PUBLICATIONS

Great Britain Search Report issued on Aug. 11, 2009 in Great Britain Patent Application No. GB0906850.3.

* cited by examiner

METHOD OF MANUFACTURING AN AEROFOIL

This invention relates to a method of manufacturing an aerofoil structure, and particularly but not exclusively relates to a method of manufacturing an aerofoil structure to have a portion with an increased erosion resistance.

It is known to manufacture hollow metallic aerofoils for example to be used as blades in a jet engine, and in particular fan blades for a turbomachine, by diffusion bonding and superplastic forming metallic panels, the panels forming pressure and suction surfaces of the blade. These blades are generally referred to as wide-chord fan blades.

The metallic panels may include elementary metal, metal alloys and metal matrix composites. Conventionally a titanium alloy is used. At least one of the metallic panels must be capable of superplastic extensions.

The atoms of titanium align in an alpha phase or beta phase crystalline structure. In the alpha phase the atoms align in a hexagonal close-packed structure and in the beta phase the atoms align in a body-centred cubic structure. It is possible to transform the alpha phase to the beta phase by heating the material. Alloying elements which are added to pure titanium may act to either stabilize the alpha phase to higher temperatures or stabilize the beta phase to lower temperatures. For example aluminium and oxygen are alpha-stabilizing elements and vanadium and nickel are beta-stabilizing elements.

Titanium alloys are divided into four classes depending on their microstructure at room temperature. These are: pure, alpha, alpha-beta, and beta; which have different material properties as a result of their microstructure.

Ti6Al4V is conventionally used in aerospace applications due to its excellent combination of strength, corrosion resistance, and ease of welding and fabrication. Presence of both an alpha-stabilizing element (Al) and a beta-stabilizing element (V) causes Ti6Al4V to have an alpha-beta microstructure.

The lowest temperature at which the beta phase can exist solely is called the beta transus; this can range from 700° C. up to 1,050° C. depending on the alloy composition. Beta alloys contain sufficient beta-stabilizing elements to maintain the beta phase following quenching.

Diffusion bonding occurs when two matte surfaces are pressed together under temperature, time and pressure conditions that allow atom interchange across the interface.

In one known process the surfaces of the panels to be joined are cleaned, and at least one surface of one or more of the panels is coated in preselected areas with a stop-off material to prevent diffusion bonding. The panels are arranged in a stack and the edges of the panels are welded together, except where a pipe is welded to the panels, to form an assembly. The pipe enables a vacuum, or inert gas pressure, to be applied to the interior of the assembly. The assembly is placed in an autoclave and heated so as to "bake out" the binder from the material to prevent diffusion bonding. The assembly is then evacuated, using the pipe, and the pipe is sealed. The sealed assembly is placed in a pressure vessel and is heated and pressed to diffusion bond the panels together to form an integral structure.

The first pipe is removed and a second pipe is fitted to the diffusion bonded assembly at the position where the first pipe was located. The integral structure is located between appropriately shaped dies and is placed within an autoclave. The integral structure and dies are heated and pressurised fluid is supplied through the second pipe into the interior of the integral structure to cause at least one of the panels to be superplastically formed to produce an article matching the shape of the dies.

In addition to the hollow structure just described, it is also known to insert a membrane between the metallic panels prior to this process. The location of diffusion bonds between the membrane and the adjacent panels can be controlled by applying the stop-off material to preselected areas on each side of the membrane (or respective panels). When the aerofoil is subsequently expanded, the membrane adheres to the panels where the diffusion bond is allowed to form and thereby provides an internal structure.

The surface, in particular the leading edge, of an aerofoil structure is exposed to impact from water droplets and airborne particulates when in service. Over time this causes the leading edge to be eroded and may result in a degradation of the performance of the engine. The position of maximum erosion of the leading edge is at the stagnation point of the aerofoil structure. The stagnation point is a point in the flow where the fluid velocity is zero and as a result the static pressure is at a maximum.

It is known to protect the leading edge of an aerofoil structure to prevent erosion by providing an additional component of harder material which is placed over the leading edge of the aerofoil structure. For example U.S. Pat. No. 5,165,859 discloses a spring steel strip which is fixed over an area of maximum erosion of a fan blade. U.S. Pat. No. 4,318,672 discloses a similar arrangement where a wear-resistant attachment made from Stellite or hard chromium alloy is applied to a surface portion of a metallic member, particularly a blade of a fan or a turbine. Whilst these known methods provide protection of the leading edge, they require an additional fixation process which must be sufficient to retain the protective means during service. This increases the time and cost of manufacturing the aerofoil structure.

In an alternative arrangement described in U.S. Pat. No. 6,524,074 to the current applicant a blade is formed having an internal membrane and a harder leading edge. The harder leading edge is provided by reducing the length of the internal membrane so that it does not extend the whole way to the edges of the panels that form the suction and pressure surfaces and providing a harder metal or alloy between the upstream edge of the membrane and the tips of the leading edge. Care is required to match up the upstream edge of the membrane and the downstream edge of the harder metal.

The present invention provides a means of increasing the erosion resistance of a portion of an aerofoil structure, in particular the leading edge, which does not have the problems associated with the prior art methods. In accordance with a first aspect of the present invention there is provided a method of manufacturing an aerofoil structure to have a portion with an increased erosion resistance, the method comprising: providing three or more titanium elements and a beta-stabilizing material; wherein the one or more elements have an alpha-beta microstructure; assembling the one or more elements and the beta-stabilizing material in a laminate such that the beta-stabilizing material is interleaved between the titanium elements in an alternating arrangement; and heating the assembly such that the beta-stabilizing material diffuses into an adjacent portion of the elements, causing the adjacent portion of the elements to have a beta microstructure which provides an increased erosion resistance.

The method may further comprise sandwiching the membrane between two panels; wherein heating the assembly is carried out prior to sandwiching the membrane between the two panels.

Assembling the one or more elements and the beta-stabilizing material may comprise sandwiching the membrane between the beta-stabilizing material and/or sandwiching the beta-stabilizing material between the two panels.

The beta-stabilizing material may be provided as a foil. The beta-stabilizing material may be an alloy comprising nickel and copper.

The beta microstructure of the adjacent portion of the one or more elements may increase the hardness of the adjacent portion.

The adjacent portion of the one or more elements may be provided along one edge of the aerofoil structure. The method may further comprise the step of machining the aerofoil structure to provide a leading edge.

The adjacent portion of the one or more elements may be provided at a leading edge of the aerofoil structure.

The adjacent portion of the one or more elements may be provided at a stagnation point of a leading edge of the aerofoil structure.

Heating the assembly may comprise heating above the beta transus temperature.

Following heating, the nonadjacent portions of the one or more elements may maintain the alpha-beta microstructure.

Assembling the one or more elements and the beta-stabilizing material may comprise assembling the one or more elements and the beta-stabilizing material such that the beta-stabilizing material is adjacent to only a portion of the one or more elements.

The method may further comprise applying pressure to the assembly to diffusion bond the one or more elements to one another.

According to another aspect of the present invention, there is provided an aerofoil structure for a turbomachine manufactured using the above method.

For a better understanding of the present invention, and to show more clearly how it may be carried into effect, reference will now be made, by way of example, to the accompanying drawings, in which.

Figure 1:
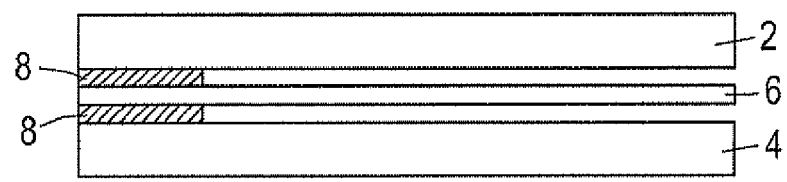
FIG. 1 shows a side view of a method of manufacturing an aerofoil in accordance with a first embodiment of the invention.

FIG. 1 illustrates a method of manufacturing an aerofoil structure in accordance with a first embodiment of the invention. The aerofoil structure comprises a first panel 2, a second panel 4 and a membrane 6. The first and second panels 2, 4 and the membrane 6 are formed from a titanium alloy which has an alpha-beta microstructure, for example Ti6Al4V. The first and second panels 2, 4 and the membrane 6 are assembled into a stack with the membrane being sandwiched between the first and second panels 2, 4. In addition, a beta-stabilizing material 8 is sandwiched either side of the membrane, between the membrane and the first and second panels 2, 4.

The beta-stabilizing material 8 is provided as a foil. The beta-stabilizing material may be a Monel alloy which contains the beta-stabilizing elements of nickel and copper, however other materials which comprise a beta-stabilizing element may be used. As shown in FIG. 1, the beta-stabilizing material 8 is provided between only a portion of the first and second panels 2, 4 and the membrane 6.

Figure 2:
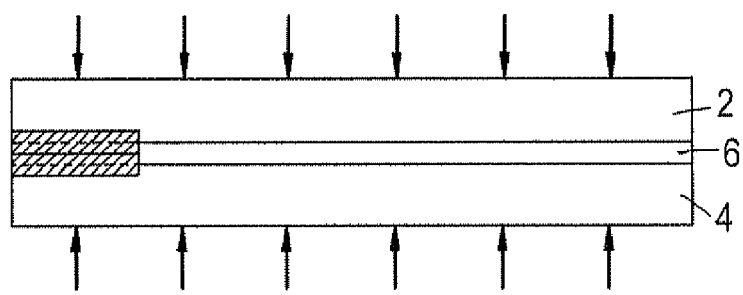
FIG. 2 shows a side view of the first embodiment of the invention in a second stage of the method.

Before being assembled into the stack, the first and second panels 2, 4 and/or membrane 6 may be coated in preselected areas with a stop-off material to prevent diffusion bonding, as described in the introduction. As shown in FIG. 2, the assembly is placed in a pressure vessel and is heated and pressed, as indicated by the arrows, to diffusion bond the panels together to form an integral structure. As a result of the diffusion bonding process the beta-stabilizing material diffuses into adjacent portions of the first and second panels 2, 4 and the membrane 6. The temperatures used in the diffusion bonding process are such that the first and second panels 2, 4 and the membrane 6 are heated above the beta transus temperature. This causes the adjacent portions of the first and second panels 2, 4 and/or the membrane 6, into which the beta-stabilizing material has diffused, to transform from an alpha-beta phase microstructure into a beta phase microstructure.

The integral structure is then hot formed to produce the external aerofoil shape.

Figure 3:
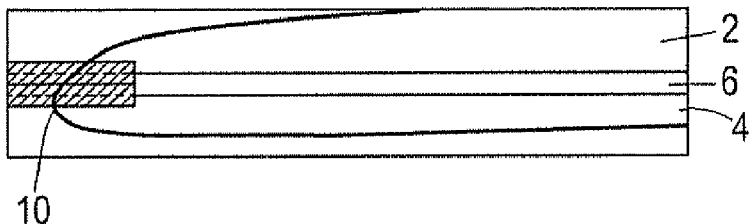
FIG. 3 shows a side view of the first embodiment of the invention in a third stage of the method.
Figure 4:
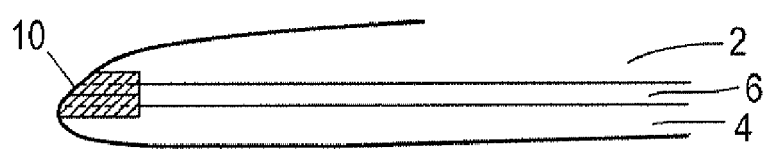
FIG. 4 shows a side view of the first embodiment of the invention in a fourth stage of the method.

As shown in FIG. 3, the leading edge 10 of the aerofoil structure is machined from the formed integral structure. The aerofoil structure is machined such that the adjacent portions of the first and second panels 2, 4 and the membrane 6 which have been transformed to a beta phase microstructure are exposed at the leading edge 10 of the aerofoil structure, particularly at the stagnation point of the aerofoil structure, as shown in FIG. 4.

As previously described the integral structure may then be located between appropriately shaped dies. The integral structure and dies are heated and pressurised fluid is supplied into the interior of the integral structure to cause at least one of the panels to be superplastically formed to produce an article matching the shape of the dies.

The beta microstructure of the leading edge 10 is harder than the alpha-beta phase microstructure of the remainder of the aerofoil; that is the portions of the first and second panels 2, 4 and the membrane 6 which were not adjacent to the beta-stabilizing material 8. The leading edge 10 thus has an increased erosion resistance compared to the remainder on the aerofoil structure. The remainder of the aerofoil structure retains the properties attributable to the alpha-beta microstructure, such as the required ductility to yield during impact to the leading edge by a bird or foreign object, for example.

In an alternative embodiment, the membrane 6 may be omitted from the aerofoil structure to give a hollow internal cavity. In this case the beta-stabilizing material 6 is sandwiched directly between the first and second panels 2, 4. The microstructure of the adjacent portions of the first and second panels 2, 4 is transformed into a beta phase microstructure which is used similarly to the first embodiment to provide a leading edge with an increased erosion resistance.

In another alternative embodiment, the beta-stabilizing material may be used to transform the microstructure of the membrane 6 prior to the membrane being assembled into the stack. In this embodiment, the beta-stabilizing material is applied to the membrane, which is then locally heat treated to cause the beta-stabilizing material to diffuse into the adjacent portions of the membrane 6. Subsequent heat treatment from the diffusion bonding and forming processes causes the material to retain a higher proportion of beta phase microstructure and thus to exhibit increased hardness.

The thickness of the beta-stabilizing material 8 may be selected to provide the desired extent of diffusion into the adjacent portions of the first and second panels and/or membrane 6. Also the temperature, pressure and time conditions of the diffusion bonding process may alter the extent of diffusion into the adjacent portions.

Although the invention has been described as providing an increased erosion resistance for a leading edge of an aerofoil structure, the beta-stabilizing material may be used in the same way to provide a localised beta phase microstructure at other portions of the aerofoil structure. For example the method could be used to provide a hardened tip of the aerofoil structure. The invention could also be used with components other than blades where a localised beta phase microstructure provides beneficial characteristics.

The present invention provides an increased erosion resistance at a portion of the aerofoil structure without altering the properties of the remainder of the aerofoil structure. The method can be incorporated easily into the standard diffusion bonding and superplastic forming process and does not require any modifications to the process parameters. The present invention therefore does not increase greatly the cost and time of manufacturing the aerofoil structure. Since the portion with an increased erosion resistance is integral to the aerofoil structure there are no additional fixation steps required and there is no risk of the portion becoming detached during service.

To avoid unnecessary duplication of effort and repetition of text in the specification, certain features are described in relation to only one or several aspects or embodiments of the invention. However, it is to be understood that, where it is technically possible, features described in relation to any aspect or embodiment of the invention may also be used with any other aspect or embodiment of the invention.

The invention claimed is:

1. A method of manufacturing an aerofoil structure to have a portion with an increased erosion resistance, the method comprising:
   providing three or more titanium elements and a beta-stabilizing material assembled in a laminate such that the beta-stabilizing material is interleaved between the titanium elements in an alternating arrangement; wherein the titanium elements have an alpha-beta microstructure;
   heating the assembly such that the beta-stabilizing material diffuses into an adjacent portion of the titanium elements, causing the adjacent portion of the titanium elements to have a beta microstructure which provides an increased erosion resistance.

2. A method of manufacturing an aerofoil structure as claimed in claim 1, wherein the beta-stabilizing material is provided as a-foil.

3. A method of manufacturing an aerofoil structure as claimed in claim 1, wherein the beta-stabilizing material is an alloy comprising nickel and copper.

4. A method of manufacturing an aerofoil structure as claimed in claim 1, wherein the beta microstructure of the adjacent portion of the titanium elements increases the hardness of the adjacent portion.

5. A method of manufacturing an aerofoil structure as claimed in claim 1, wherein the adjacent portion of the titanium elements is provided along one edge of the aerofoil structure.

6. A method according to claim 1, wherein the beta-stabilizing material is adjacent only a portion of the titanium elements.

7. A method of manufacturing an aerofoil structure as claimed in claim 1, wherein the adjacent portion of the titanium elements is provided at a leading edge of the aerofoil structure, the method further comprising the step of machining the aerofoil structure to provide a leading edge.

8. A method of manufacturing an aerofoil structure as claimed in claim 1, wherein heating the assembly comprises heating above the beta transus temperature.

9. A method of manufacturing an aerofoil structure as claimed in claim 1, wherein following heating, the nonadjacent portions of the titanium elements maintain the alpha-beta microstructure.

10. A method of manufacturing an aerofoil structure as claimed in claim 1, wherein assembling the elements and the beta-stabilizing material comprises assembling the elements and the beta-stabilizing material such that the beta-stabilizing material is adjacent to only a portion of the elements.

11. A method of manufacturing an aerofoil structure as claimed in claim 1, the method further comprising applying pressure to the assembly to diffusion bond the titanium elements to one another.

12. A method of manufacturing an aerofoil structure as claimed in claim 11, the method further comprising placing the diffusion bonded titanium elements in a die and supplying pressurized fluid between at least two of the titanium elements to deform at least one of the panels to deform against the die.

* * * * *